United States Patent [19]
Harmand

[11] Patent Number: 5,372,031
[45] Date of Patent: Dec. 13, 1994

[54] DEVICE FOR VACUUM TESTING OF CLOSED SYSTEMS

[76] Inventor: Brice Harmand, 3732 W. Century Blvd., Unit 1, Inglewood, Calif. 90303

[21] Appl. No.: 86,238

[22] Filed: Jul. 1, 1993

[51] Int. Cl.⁵ .................. G01M 15/00; G01M 3/26
[52] U.S. Cl. .......................... 73/40; 73/45.4; 73/49.7; 73/52; 73/303; 73/46; 73/47
[58] Field of Search ............... 73/40, 45.4, 46, 47, 73/49.7, 52, 303

[56] References Cited

U.S. PATENT DOCUMENTS

| | | | |
|---|---|---|---|
| 3,362,225 | 1/1968 | Noble | 73/49.1 |
| 4,617,824 | 10/1986 | Cybulski et al. | 73/49.7 |
| 5,201,213 | 4/1993 | Henning | 73/40 |

FOREIGN PATENT DOCUMENTS 947909 10/1961 United Kingdom .

OTHER PUBLICATIONS

Sales brochure for vacuum tester.
Advertisement in *Hopper* catalog.
Advertisement in *The Precision Manufacturing and Sales Company, Inc.*, catalog, 1992.

*Primary Examiner*—Thomas P. Noland
*Assistant Examiner*—J. David Wiggins
*Attorney, Agent, or Firm*—Brown, Martin, Haller & McClain

[57] ABSTRACT

The vacuum tester has a housing which is small enough to be held in one hand in which is contained a small vacuum pump, an activator switch and a vacuum gauge. A non-return flap valve, or check valve, is disposed between the vacuum pump and the vacuum gauge so that the vacuum within the chamber under test is not lost once the vacuum pump has been turned off. A connector with a vacuum hose extending therefrom is provided to apply the vacuum to the chamber. Interchangeable adapters can be attached at the end of the vacuum hose to provide a seal with the opening in the chamber. Detection and quantization of leaks in closed systems is provided by observing the leak-back rate on the vacuum gauge once the vacuum pump has been turned off.

9 Claims, 1 Drawing Sheet

DEVICE FOR VACUUM TESTING OF CLOSED SYSTEMS

The quality of various seals in an internal combustion engine is critical to achieving optimal engine performance. For example, the seal between the cylinder head and the engine block is important for maintaining repeatable compression levels that are uniform between the cylinders. These compression levels are also highly sensitive to the integrity of the seal between the valve head and valve seat. An inadequate seal must be corrected by machining of the cylinder head, engine block or valve, or replacement of the defective component, in order to assure proper engine performance.

The integrity of the seal between the valve seat and the valve head is determinative of whether a valve job should be performed, and must be carefully monitored when performing a valve job. Means for testing the seal integrity is commonly provided by vacuum testers which consist of a vacuum pump, a pressure gauge, a control switch for the vacuum, and means for applying the vacuum to the cylinder, usually through the inlet and exhaust manifold ports or the spark plug holes. Many of the vacuum testers that are commercially available have housings which are approximately the size of a car battery which contain relatively high volume electrically powered vacuum pumps that create a vacuum to draw air out of the cylinder. These pumps are limited to creating 85–86% vacuum. The leak detection occurs during pumping because as soon as the vacuum is shut off, there is backflow into the volume being tested. The fact that the actual testing must occur while the vacuum pump continues to operate means that the pump sucks the leak, and the reading provided may give the appearance of a good seal even in the presence of a small leak. The inaccuracy of this process makes such vacuum testers capable of detecting only large leaks or sealing problems. In addition, the large size of these devices makes them cumbersome, especially in an already crowded engine compartment. Another drawback of traditional vacuum testers is that their high flow volume and large size make them impractical for use in vacuum testing of other systems within a vehicle, such as the brake system, pneumatic systems, e.g., door mechanisms, sunroof mechanisms, and air conditioning system. The high flow makes it difficult to detect small leaks which are more likely to occur in such systems.

The small leaks that are undetectable by commonly available vacuum testers may still have significant impact on the engine's performance. Even a small leak can cause non-uniform heat transfer between the valve head and seat, and particulates can become lodged in these small spaces. With the increase in sophistication of cylinder heads in modern engine designs comes increased sensitivity to incomplete seals. Thus, improved techniques are required to restore engines to the OEM standards. These techniques must include, among other things, greatly improved accuracy in vacuum testing techniques.

BRIEF SUMMARY OF THE INVENTION

It is an advantage of the present invention to provide a highly accurate vacuum testing device for use in automotive diagnostics and repair.

It is another advantage of the present invention to provide a vacuum testing device that is hand-held and portable, allowing for use in a broad range of applications within the automotive repair industry.

In an exemplary embodiment, the vacuum tester has a housing which is small enough to be held in one hand in which is contained a small venturi-type vacuum pump, an activation switch and a vacuum gauge. A non-return flap valve, or check valve, is disposed between the vacuum pump and the vacuum gauge so that the vacuum within the chamber under test is not lost once the vacuum pump has been turned off. An input connector is located at the end of the housing to provide connection between a compressed air source and the inlet of the venturi pump. An exhaust port is located on the end of the housing, connected to the outlet of the vacuum pump. At the other end of the housing, a connector with a vacuum hose extending therefrom is provided to apply the vacuum to the chamber. Interchangeable adapters can be attached at the end of the vacuum hose to provide a seal with the opening in the chamber.

Testing is conducted with the vacuum tester by attaching an appropriate interchangeable adaptor to the end of the hose and placing the adaptor against the chamber opening. The activator switch is depressed to connect the vacuum line and the venturi tube, activating the vacuum pump and causing the air within the vacuum hose and the chamber to be exhausted through the pump outlet along with the compressed air exiting the venturi tube. After the chamber is fully evacuated, the pump connection is closed. The flap valve closes, preventing the vacuum in the chamber from drawing air back through the device, allowing the vacuum to be maintained. If the chamber under test is leak-free, the vacuum gauge reading will remain stable, and the vacuum will not be released until the bleed valve is opened, allowing the adaptor to be removed from the chamber. If the chamber does not have a good seal, a leak-back will be indicated by a drop in the vacuum measured by the gauge. The leak-back rate is used to determine the seriousness of the leak and whether it is acceptable or not.

The ability to accurately measure the leak-back rate will permit the establishment of quantifiable standards for seal quality. Original equipment manufacturers can specify a leak-back rate that is required for factory-level performance, allowing service personnel to perform the necessary adjustments to attain that level.

The small size of the vacuum tester is made possible by the use of a small but efficient vacuum pump. Since the pump is more controllable than the large pumps used in the industry, it is capable of being used with lower volume systems within vehicles, such as brake systems or air conditioners. These systems have much smaller volumes than those of the engine cylinders, and the large vacuum pumps can place so much vacuum on the small volume that the minute relative change that occurs due to a leak would be undetectable.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DESCRIPTION OF THE PREFERRED EMBODIMENT

Figure 1:
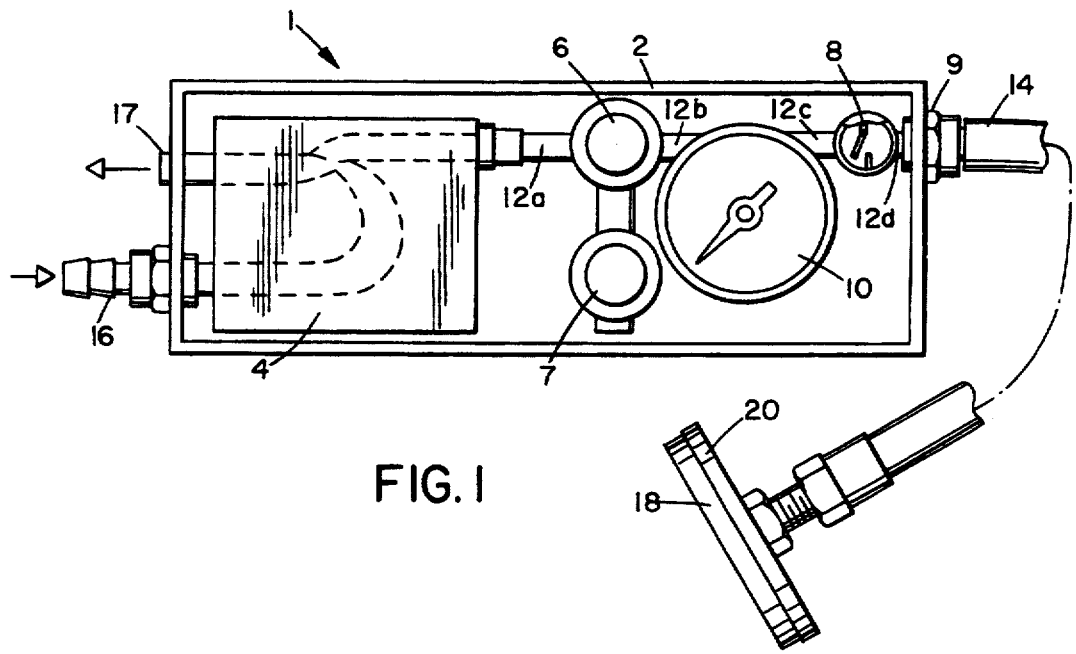
FIG. 1 is a diagrammatic view of the present invention.
Figure 2:
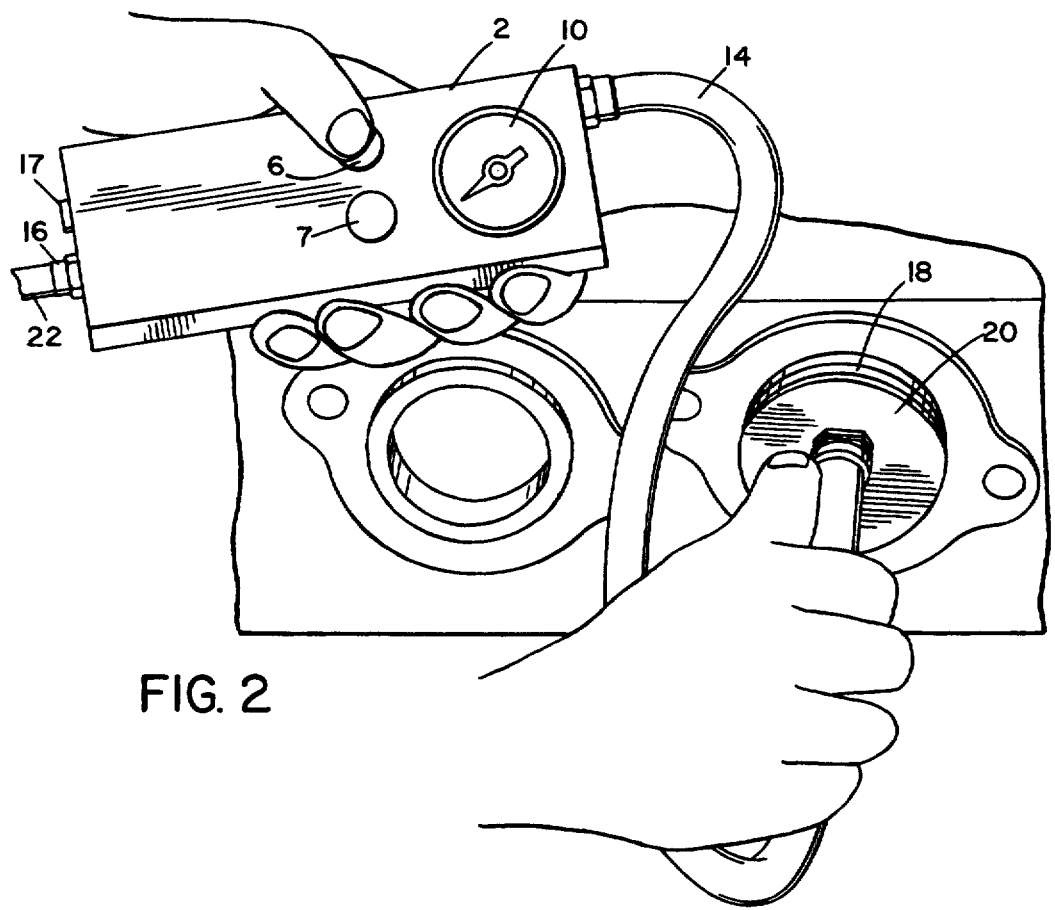
FIG. 2 is a perspective view of the inventive vacuum tester in use.

As illustrated in FIGS. 1 and 2, the vacuum tester 1 has a housing 2 (shown with the top cover removed in FIG. 1) which is generally rectangular with dimensions that will readily fit into the user's hand. A small venturi-type vacuum pump 4, an activator switch (valve) 6, a bleed valve 7, a flap valve 8 and a vacuum gauge 10 are built into the housing. Internal tubing 12 consisting of five segments 12a–12e, connects the pump 4 to activator switch 6 (tube 12a), activator switch 6 to gauge 10 (tube 12b), gauge 10 to flap valve 8 (tube 12c), flap valve 8 to outlet 9 (tube 12d) which provides connection to the external vacuum tubing 14. Tube segment 12e connects activator switch 6 to bleed valve 7. At the end of the housing opposite the external vacuum connection, an inlet tube 16 is connected at its innermost portion to the pump input to direct compressed air, via air hose 22 connected at the outermost portion of inlet tube 16, through the venturi tube in the pump then out of exhaust port 17.

Connection to the chamber or system being tested is provided by interchangeable attachments at the end of vacuum tubing 14. For leak testing of a cylinder head to determine the quality of the valve seal, resilient sealing pads 18 mounted on acrylic mounting plates 20 are provided in different sizes to fit exhaust or inlet ports. When pressed against the port so that the port is completely covered, the pad forms an airtight seal. The acrylic plates may be reinforced with metal mesh. Alternatively, the support plates can be made from metal, the key being that they are rigid enough to prevent the pad from being drawn into the chamber. For use, the pad 18 is manually held against the port until the vacuum is activated, at which time the vacuum will hold the pad in place.

The vacuum tubing 14 that provides the external connection to the pad is vinyl or a similar polymer and may be reinforced with metal mesh to resist collapse under vacuum.

Measurement of the leak-back rate of the chamber or system being tested is accomplished by discontinuing the pumping by moving the activator switch to the closed position after the vacuum has reached its maximum level. The vacuum gauge is then observed to determine if the level of the vacuum decreases once pumping is halted. If no change occurs, or if very little change occurs over an extended period, the system is leak-free. If the vacuum level decreases, there is a leak, the severity of which can be quantized by observing the leak-back rate (increase in pressure with time). Even if quantization is not desired, the severity of the leak can be determined by the relative rate of return to atmospheric pressure once the vacuum pump is turned off.

The flap valve 8 is key to the ability to obtain accurate indication of small leaks. The flap valve traps the vacuum within the tubing between the valve and the chamber or system under test after the vacuum stops by closing when the vacuum is greater in the chamber (upstream from the valve) than it is downstream from the valve. Since it is undesirable to introduce a variable within the vacuum tester itself, it is important that the tubing and connections within the tester are vacuum tight. This will assure that a high leak-back rate is attributable only to a leak in the system under test. The vacuum can be released only by depressing the bleed switch 7 to activate a bleed valve to admit air into the chamber. Since the vacuum pump is no longer drawing air out of the system, there is no risk of sucking the leak and disguising it. Other types of check valves which prevent backflow may be substituted for the flap valves.

The vacuum pump 4 is a venturi-type pump which has the capability of achieving an outflow rate equivalent to that of the large pumps which are traditionally used in vacuum testers. In the preferred embodiment, the pump has a capacity of 0.53 liter/second and is capable of creating a 94% vacuum. The pump 4 is "powered" by compressed air or gas which is provided by connecting a compressed air line to inlet tube 16. Venturi-type pumps are known in the art. As the compressed air passes through the venturi tube, the air is drawn from the chamber and is exhausted, along with the compressed air on the downstream end of the venturi tube, through exhaust port 17.

The vacuum gauge 10 covers a sufficiently narrow scale to allow measurement of minor changes in vacuum level. In the preferred embodiment, the gauge covers the range of $-100$ to $0$ kPa or $-30$ to $0$ mmHg. The gauge indicates complete evacuation of the system under test within the range of approximately $-90$ kPa to $-95$ kPa, at which time the vacuum pump 4 is turned off and the leak-back test begins. (In the event that a large leak is present, this level of vacuum cannot be attained. Failure to reach a minimum vacuum level will, in itself, indicate the presence of the leak.)

Other systems within a vehicle that will benefit from leak testing include the brake system, the water cooling circuit of the engine, the air conditioner, and pneumatically controlled locks and guides, such as those in doors and sunroofs, etc. For each of these systems, access is obtained via a port or tube in the system, for example, the bleed nipple of a brake system after the liquid contents of the system are drained. An adaptor appropriate for providing a vacuum-tight seal with the port or tube is attached to the end of tubing 14, and the vacuum test is initiated.

The housing 2 is rectangular in shape and has a size small enough to be easily held in one hand. This allows the user to keep the other hand free for making adjustments to the engine. The activator switch 6 is positioned for access by the thumb on the hand that is holding the device so that activation and deactivation of the pump can be accomplished with only one hand. The switch 6 may be a button, as shown in the figures, a rocker or toggle switch, or any other type of switch suitable for opening or closing a port between the internal tubing 12 and the venturi tube. Shown next to switch 6 is bleed control 7, which is also readily accessible to the thumb of the hand holding the tester. When the test is completed and the vacuum is to be released, air is re-introduced into the vacuum lines and chamber under test by depressing bleed control 7.

The housing may be made from steel, aluminum or durable plastic. The housing should be made from durable material to tolerate the automotive repair shop environment. The dimensions of the housing in the preferred embodiment are on the order of $2'' \times 2'' \times 6''$ (50 mm $\times$ 50 mm $\times$ 150 mm).

The vacuum tester according to the present invention provides a capability that has not previously been available to the automotive repair industry. In spite of the increasing degree of sophistication in the manufacture and design of vehicle engines, many tools used for maintaining those engines are antiquated and incapable of achieving the required precision to properly maintain these engines to their original specifications.

The inventive vacuum tester improves upon the prior art by providing a versatile and easy to handle means for leak testing a number of closed systems. The vacuum tester can be maneuvered within relatively small spaces and operated with only one hand, leaving the other hand free to make adjustments or to determine the exact location of the leak.

It will be evident that there are additional embodiments and applications which are not disclosed in the above detailed description of a preferred embodiment but which clearly fall within the scope and spirit of the present invention. The specification is not intended to be limiting, and the scope of the invention is to be limited only by the appended claims.

I claim:

1. A vacuum leak tester for identifying the presence and severity of a leak in a closed system in a motor vehicle, said vacuum tester comprising:
   a venturi-type vacuum pump having a capacity for evacuating said closed system;
   a compressed air supply for creating a vacuum within said vacuum pump, said compressed air supply having an air hose connected thereto;
   a switch means for activating and deactivating said vacuum pump;
   a valve for preventing airflow into said closed system when it is evacuated;
   a vacuum gauge for measuring an amount of vacuum in said closed system;
   a first vacuum tube having a plurality of segments interconnecting said vacuum pump, said valve means and said vacuum gauge;
   a housing for containing said vacuum pump, said switch means, said valve, said vacuum gauge and said first vacuum tube, said housing having an inlet means connected to said vacuum pump adapted to mate with said air hose, said housing having dimensions whereby said housing can be held in one hand; and
   a second vacuum tube external to said housing and interconnected with a segment of said first vacuum tube which is connected to said valve at a first end of said second vacuum tube and with an adaptor at a second end of said second vacumm tube for applying the vacuum to said closed system;
   wherein the presence and severity of the leak is indicated by a leak-back rate measured by said vacuum gauge.

2. A vacuum tester as in claim 1 wherein said valve means is a flap valve.

3. A vacuum tester as in claim 1 wherein said switch means comprises a button disposed on said housing to be in reach of said one hand holding the vacuum tester.

4. A vacuum tester as in claim 1 wherein said adaptor comprises a resilient sealing means.

5. A vacuum tester as in claim 1 further comprising a bleed valve for releasing the vacuum within said closed system.

6. A hand held vacuum tester for use in detecting and measuring small leaks between a valve seat and a valve in a chamber of an internal combustion engine, the vacuum tester comprising:
   a housing having dimensions such that it can be held in one hand;
   a vacuum pump disposed within said housing, said pump being driven by compressed air and having a capacity for evacuating said chamber, said vacuum pump having an inlet whereby said compressed air is introduced;
   a compressed air supply for driving said vacuum pump, said compressed air supply having an air hose connected thereto for attachment to said inlet;
   a switch disposed on said housing for connecting and disconnecting said compressed air supply and said vacuum pump;
   a vacuum gauge disposed within said housing;
   an internal vacuum tube disposed within said housing joining said vacuum pump and said vacuum gauge;
   a flap valve disposed along said internal vacuum tube between said vacuum pump and said vacuum gauge for preventing air from flowing back into said chamber when said vacuum pump is disconnected from said compressed air supply;
   an external vacuum tube having a first end and a second end, said first end being connected to an end of said internal vacuum tube downstream from said vacuum gauge; and
   a sealing means connected to said second end of said external vacuum tube for sealing said chamber for evacuation;
   wherein a leak is measured by evacuating said chamber, disconnecting said vacuum pump from said compressed air supply and observing a leak-back rate on said vacuum tester.

7. A hand held vacuum tester as in claim 6 wherein said vacuum pump is a venturi-type pump.

8. A hand held vacuum tester as in claim 6 wherein said sealing means comprises a resilient pad mounted on a rigid mounting plate.

9. A vacuum tester as in claim 6 further comprising a bleed valve for releasing the vacuum within said chamber.

* * * * *